United States Patent
Ker et al.

(10) Patent No.: US 10,252,235 B2
(45) Date of Patent: Apr. 9, 2019

(54) CONTROL OVER CATALYST PARTICULATE FEED INTO AN OLEFIN POLYMERIZATION REACTOR

(71) Applicant: NOVA Chemicals (International) S.A., Fribourg (CH)

(72) Inventors: Victoria Ker, Calgary (CA); Richard Paul Kong-Labrie, Sarnia (CA)

(73) Assignee: NOVA Chemicals (International) S.A., Fribourg (CH)

( * ) Notice: Subject to any disclaimer, the term of this patent is extended or adjusted under 35 U.S.C. 154(b) by 10 days.

(21) Appl. No.: 15/326,190

(22) PCT Filed: Jul. 7, 2015

(86) PCT No.: PCT/IB2015/055141
§ 371 (c)(1),
(2) Date: Jan. 13, 2017

(87) PCT Pub. No.: WO2016/012891
PCT Pub. Date: Jan. 28, 2016

(65) Prior Publication Data
US 2017/0203269 A1    Jul. 20, 2017

(30) Foreign Application Priority Data
Jul. 22, 2014    (CA) ..................... 2857456

(51) Int. Cl.
| | |
|---|---|
| B01J 8/00 | (2006.01) |
| B01J 8/18 | (2006.01) |
| G01F 11/24 | (2006.01) |
| G05D 7/06 | (2006.01) |
| B05B 7/14 | (2006.01) |

(52) U.S. Cl.
CPC ............... *B01J 8/002* (2013.01); *B01J 8/18* (2013.01); *B05B 7/1436* (2013.01); *B05B 7/1463* (2013.01); *G01F 11/24* (2013.01); *G05D 7/0629* (2013.01); *B01J 2208/00752* (2013.01); *B01J 2208/00769* (2013.01)

(58) Field of Classification Search
CPC .. B01J 8/002; B01J 8/18; B01J 8/1818; B05B 7/1463; B05B 7/1436; G01F 11/24
USPC .............. 222/1, 370, 333, 195, 630, 636; 406/63–67
See application file for complete search history.

(56) References Cited

U.S. PATENT DOCUMENTS
| | | |
|---|---|---|
| 2,655,411 A | 10/1953 | Smith |
| 2,825,721 A | 3/1958 | Hogan et al. |

(Continued)

FOREIGN PATENT DOCUMENTS
| | | |
|---|---|---|
| EP | 0 099 774 A1 | 6/1983 |
| WO | 02/074818 A1 | 9/2002 |

OTHER PUBLICATIONS

Brunauer, Stephen; Emmett, P.H. and Teller, Edward; Adsorption of Gases in Multimolecular Layers; Submitted Feb. 1938; Journal of the American Chemical Society, Published 1938, v 60, pp. 309-319.

(Continued)

*Primary Examiner* — Lien Ngo
(74) *Attorney, Agent, or Firm* — Julie L. Heinrich (57) ABSTRACT

The feed rate of a supported particulate catalyst through a unit body rotary disc catalyst feeder may be controlled by controlling the feed of nitrogen to the upper surface of the rotary disc.

10 Claims, 3 Drawing Sheets

(56) References Cited

U.S. PATENT DOCUMENTS

| | | | |
|---|---|---|---|
| 3,023,203 A | 2/1962 | Dye | |
| 3,622,251 A | 11/1971 | Allen | |
| 3,704,287 A | 11/1972 | Johnson | |
| 3,779,712 A | 12/1973 | Calvert et al. | |
| 3,876,602 A * | 4/1975 | Calvert | B01J 8/0015 526/86 |
| 4,011,382 A | 3/1977 | Levine et al. | |
| 4,100,105 A | 7/1978 | Levine et al. | |
| 4,719,193 A | 1/1988 | Levine et al. | |
| 5,209,607 A * | 5/1993 | Wei | B01J 8/002 222/636 |
| 5,356,599 A * | 10/1994 | Miura | B01J 8/002 222/370 |
| 5,365,599 A | 11/1994 | Seto et al. | |
| 5,434,116 A | 7/1995 | Sone et al. | |
| 5,554,775 A | 9/1996 | Krishnamurti et al. | |
| 5,637,659 A | 6/1997 | Krishnamurti et al. | |
| 5,733,987 A | 3/1998 | Covezzi et al. | |
| 6,235,853 B1 * | 5/2001 | McKay | C08F 10/00 502/155 |
| 7,891,527 B2 | 2/2011 | Dentler et al. | |
| 8,075,846 B2 | 12/2011 | Al-Qahtani et al. | |
| 2002/0103310 A1 * | 8/2002 | Szul | C08F 10/02 526/114 |

OTHER PUBLICATIONS

Peri, J.B. and Hensley, A.L., Jr.; The Surface Structure of Silica Gel, The Journal of Physical Chemistry, 70, (1966), pp. 2926-2933.
Noshay, A. and Karol, F.J.; Transition Metal Catalyzed Polymerizations; Chemical Activation of Silica Supports for Chromocene-Based Polyethylene Catalysts; 1989; pp. 396-416.

* cited by examiner

CONTROL OVER CATALYST PARTICULATE FEED INTO AN OLEFIN POLYMERIZATION REACTOR

TECHNICAL FIELD

The present invention relates to a method to improve the feed of fine particulates such as catalysts. Improved control over a pulsed feed system is achieved by controlling the speed of a rotary disk feeder, the pressure and flow rate of a gas to clear the particulates from the feeder.

BACKGROUND ART

U.S. Pat. No. 2,655,411 issued Oct. 13, 1953 to L. H. Smith, assigned to Standard Oil Development Company, discloses a method and apparatus for handling fluidizable finely divided solid materials. The apparatus comprises a rotating disk. However, the disk does not have passage through it rather the disk has pockets on its surface and is eccentric relative to a lower opening and powered feed on the disk is swept off into an opening arising from the eccentricity of the disk into a passage for feeding the powder to a reactor. The powder may be aluminum chloride for the polymerization of polyisobutylene.

U.S. Pat. No. 3,779,712 issued Dec. 18, 1973 to Calvert et al., assigned to Union Carbide Corporation discloses a particulate solids injector apparatus substantially as used in the present invention. A unit body metering disk has a number of evenly spaced hole there through adjacent the perimeter of the disk. The holes are filled with particulate feed and as the hole rotates over a passage in the bottom plate the feed passes into an entrainment chamber. The disclosure does not teach a feed of an inert gas to the under surface of the cover plate.

U.S. Pat. No. 5,365,599 issued Oct. 18, 1994 to Miura et al., assigned to Sumitomo Chemical Co., Ltd. teaches a rotary disk catalyst feeder. FIG. 3 and the passage in the disclosure at Col. 5 lines 50 to 60 discloses applying a predetermined amount of inert gas from the inert gas source. This is termed the "flow rate adjusting unit. The reference does not teach or suggest how to adjust the flow rate.

U.S. Pat. No. 7,891,527 issued Feb. 22, 2011 to Dentler et al., assigned to Univation Technologies, LLC teaches a particulate solids injector. The injector is of a different design from the 712 and the 599 patents. The metering disk is a two piece metering disk 205 (Col. 6 lines 20 to 25). The disclosure teaches at Col. 8 lines 32 to 45 the use nitrogen to dislodge any solid material that does not fall freely from the metering disk. The disclosure is silent on if or how the supply of nitrogen might be changed.

U.S. Pat. No. 8,075,846 issued Dec. 13, 2011 to Al-Qahtani et al., assigned to Jubail Petrochemical Co. (Kemya") teaches a pressure control system for maintaining the pressure differential between a rector and a catalyst feeder. The disclosure discloses a pressure system and controller to maintain a substantially constant pressure within the reactor.

The present invention seeks to provide an improved method to control the feed rate of particulate materials, and particularly catalyst through a unit body metering disk having vertical passages there through which opens into a passage through a bottom plate by controlling one or more of the speed (or rotation) of the unit body metering disk, the pressure and volume of an inert gas fed to the upper surface the metering disk.

DISCLOSURE OF INVENTION

In one embodiment the present invention provides a method to control the flow of a finely divided particulate material leaving a feeder comprising a metering device comprising in cooperating arrangement:

a top plate;

a unit body metering disk having a plurality of equally spaced vertical passages proximate to the perimeter of said metering disk extending through the metering disk adapted to meter predetermined amounts of finely divided materials;

a drive means;

a bottom plate having at least one passage there through positioned to receive finely divided particulate material from said metering disk; and a variable pressure and volume feed for an inert compressed gas to the upper surface of said metering disk;

said top plate and said bottom plant being joined together to define a partially enclosed disk shaped cavity substantially conforming to the shape and size of the disk;

said top plate at least partially covering and in sealing relationship with the upper surface of said disk, and having an opening there through to permit said finely divided particulate material to flow into said cavities and to sweep excess finely divided particulate material off the top of the metering disk as it passes beneath said top plate;

said drive means extending through at least one of said top or bottom plate or both and connected to a variable drive means to turn said metering disk;

said variable pressure and variable flow feed feeding inert gas to the upper surface of the metering disk covered by said top plate comprising controlling one or more of the speed of the metering disk, the pressure of the inert gas, and the flow rate of the inert gas.

In a further embodiment the feeder further comprises a reservoir for finely divided particulate material above and in cooperating sealing arrangement with said upper plate.

In a further embodiment the feeder further comprises a discharge means for said finely divided particulate material below and in cooperating arrangement with said bottom plate feeding a chemical reactor.

In a further embodiment the finely divided particulate material comprises a catalyst on an inert support selected from the group consisting of silica, alumina, titania, and clays.

In a further embodiment the catalyst is selected from the group consisting of chrome catalysts, Ziegler Natta catalyst, metallocene catalysts, constrained geometry catalysts and bulky ligand heteroatom catalysts, and mixtures thereof.

In a further embodiment the speed of the metering disk is between 0.1 and 1.3 rpm, preferably less than 0.75 rpm, most preferably less than 0.30 rpm.

In a further embodiment in the pressure of the inert gas fed to the upper surface of the metering disk is at least 2000 kPa (290 psi) preferably greater than 2200 kPa (320 psi) and typically less than about 3450 kPa (500 psi).

In a further embodiment the flow rate of inert gas to the upper surface of the metering disk is from $9.25 \times 10^{-2}$ m$^3$ per minute or 3.27 standard cubic feet per minute (scfm) to $106 \times 10^{-2}$ m$^3$ per minute (37.3 scfm), preferably from $18.4 \times 10^{-2}$ m$^3$ per minute (6.5 scfm) to $35.4 \times 10^{-2}$ m$^3$ per minute (12.5 scfm).

In a further embodiment the reactor is a fluidized bed gas phase reactor for the polymerization of olefins and the catalyst has a reactivity of not less than 2000 g of polymer per gram of catalyst.

In a further embodiment the catalyst contains a phosphinimine ligand.

In a further embodiment the polymerization mixture comprises ethylene and up to 20 vol. % of one or more $C_{3-6}$ copolymerizable monomers.

In a further embodiment the reaction is in condensed mode.

BEST MODE FOR CARRYING OUT THE INVENTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the properties that the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

The operation of the metering section of a particulate feeder will now be described in conjunction with FIG. 1. The metering section of a particulate feeder is disposed between a reservoir for the particulate material and a transfer line to move the particulate material to an end location such as a chemical reactor. There may be a sieve between the lower end of the reservoir and the upper end of the metering mechanism to prevent oversized particulate material from entering the metering mechanism.

Figure 1:
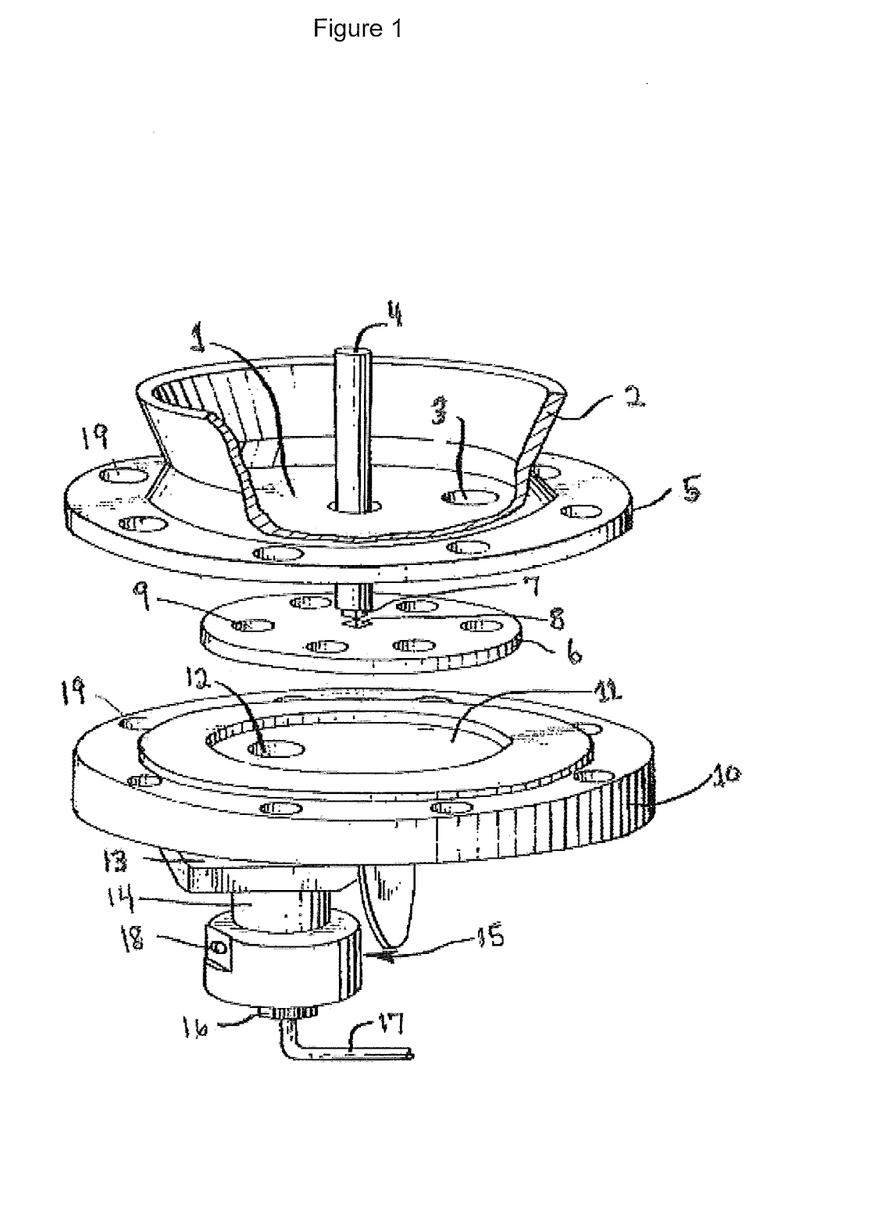
FIG. 1 is a schematic drawing of the metering section of a particulate feeder in accordance with the present invention.

The metering section is shown in FIG. 1 comprises in co-operating arrangement the following elements. A top plate 1 to which is welded a flange 2. The flange provides a seal to the particulate reservoir. Means other than welding such as bolts could be used to fix the flange to the top plate. Offset from the center of the top plat is an opening or port 3 permitting the particulate material access to the metering disk. In the particular embodiment shown in FIG. 1 there is a cylindrical drive shaft 4 which passes through the reservoir and the center of the top plate 1. In the top plate there is an opening and channel 5 to permit the flow of an inert gas to the upper surface of the metering disk 6. In this embodiment the end of the drive shaft has been machined to form a square pin 7 which fits into a box 8 machined into the center of the metering disk. While the pin and box in this embodiment are square other shapes such as star etc. would be acceptable. Spaced radially from the center of the metering disk an amount equal to distance port 3 is spaced from the center of the top plate are a series of equally spaced vertical channels (holes) 9. The channels need not be cylindrical in shape for example as disclosed in U.S. Pat. No. 5,356,599 the channels could have an inward upward taper. Bottom plate 10, has a circular recess 11 machined therein. The diameter and depth of the recess have a close tolerance to the diameter and height of the metering disk 6. There is an opening or port 12 through the bottom plate. The opening or port is radially spaced from the center of the recess an amount equal to the spacing of the channels 9 from the center of the metering disk 6. Below the bottom plate 10 and in alignment with port 12 is discharge coupling 13 that receives particulate feed from port 12. The coupling also engages an entrainment chamber 14. The bottom of the entrainment chamber 15 has an internal shape in the form of a cone with the small end at the bottom of the entrainment chamber. The cone opens onto a standard tube coupling 16 to attach a small diameter tube 17 (e.g. capillary tube) to the entrainment chamber 14. There is a tangential port 18 in the entrainment chamber to provide an inert gas to force the particulate material into tube 17. Tube 17 leads to the device requiring the particulate material, typically a polymerization reactor, preferably a fluidized or stirred bed reactor.

The top and bottom plates have a number of matching holes there through 19 to permit the top and bottom plate to be bolted together and typically bolted to the bottom of the reservoir.

The catalyst feeder and the associated sections of the metering device need to be air tight. Accordingly there are appropriate seals and gaskets between the parts. In operation the reservoir is typically at a pressure at least about 207 kPa (30 psi) typically from 207 kPa (30 psi) to about 689 kPA (100 psi), desirably from about 207 kPa (30 psi) to 551 kPa (80 psi) psi higher than the pressure of the final destination of the particulate material. For example a fluidized bed gas phased reactor may operate at pressures between typically from about 551 kPA (80 psi) to 2067 kPa (300 psi). To force the particulate fee down a capillary tube to the reactor would require a pressure typically from about 758 kPa (110 psi) to about 2618 kPa (380 psi).

In operation the particulate feed drops through a screen in the reservoir on to the upper surface of top plate 1 inside the flange 2. The particulate feed will drop through port 3 when the top of a channel 9 in the metering disk passes beneath it.

As the metering disk moves the solid section the metering disk passes under the port 3 and the particulate material no longer can drop down. In some instance the excess particulate feed is pushed up from the channel 9 into port 3 as the land areas of the metering disk 6 move beneath port 3. As the disk continues to rotate the bottom of a channel 9 aligns with port 12. The particulate material in the channel 9 falls/is pushed into the entrainment device 15. As will be explained later this depends on one or more of the pressure and volume of the inert gas fed to the upper surface of the metering plate via inlet 5.

The particulate material falls to the cone shaped cavity at the bottom 15 of the entrainment zone. Periodically a puff of inert gas enters port 18 and transfers the particulate material into and down the tube 17.

In one embodiment of the present invention the fine particulate material feeder is useful for feeding catalyst to a gas phase reactor for the polymerization of a polymer comprising alpha olefins such as ethylene and one or more $C_{3-6}$ alpha olefins typically 1-butene and 1-hexene. The composition of the polymer may comprise up to about 20 vol. % (mole %) of such $C_{3-6}$ olefins.

The amount of catalyst feed needs to be consistent. If the "shot size" is inconsistent it may raise problems with controlling the reactor. The process of the present invention is useful with catalysts having an activity of not less than 2000 grams of polymer per gram of catalyst.

The catalyst may be selected from the group consisting of chrome catalysts, Ziegler Natta catalyst, metallocene catalysts, constrained geometry catalysts and bulky ligand heteroatom catalysts.

The catalysts are supported catalysts.

Supports

Catalyst supports are well known in the art and may be chosen from a wide range of well-known materials or mixtures thereof. For example, catalyst support materials include inorganic oxides, such as but not limited to silica; alumina; titania; magnesium; zeolites; layered clay minerals; agglomerated support materials; and polymer supports such as but not limited to polyethylene, polypropylene, polystyrene, or poly(aminostyrene) supports. In some cases, a support material can also act as a polymerization catalyst activator or as a co-activator. For example, supports that comprise aluminum alkyls, aluminum alkyl halides and alkyl aluminum alkoxides are suitable for use as a "support-activator".

The supported catalysts of the current invention can be formed in situ in the presence of the support material or the support can be pre-impregnated or premixed, simultaneously or sequentially, with one or more polymerization catalysts.

Preferred supports for use in the current invention are inorganic oxides.

The inorganic oxide used in the current invention may be any oxide of the metals from groups 2, 3, 4, 11, 12, 13 and 14 of the Period Table of Elements. Preferred inorganic oxides include silica, $SiO_2$; aluminophosphate, $AlPO_4$; magnesia, MgO; alumina, $Al_2O_3$; titania, $TiO_2$; zinc oxide, ZnO; and zirconia, $ZrO_2$ and the like or mixtures thereof, with $SiO_2$ being most preferred. When the inorganic oxide is a silica support, it will contain not less than 80% by weight of pure $SiO_2$, the balance being other oxides such as but not limited to oxides of Zr, Zn, Mg, Ti, Mg and P.

The inorganic oxide support is composed of particles having a spheroid shape and a size ranging from about 10 micrometers to about 150 micrometers (μm). The particle size distribution can be broad or narrow. The inorganic oxide typically will have a surface area of at least about 100 m²/g, preferably from about 150 to 1,500 m²/g. The pore volume of the inorganic oxide support should be at least 0.2, preferably from about 0.3 to 5.0 ml/g. The surface area and pore volume are determined by nitrogen adsorption according to B.E.T. techniques, which are well known in the art and are described in the *Journal of the American Chemical Society*, 1939, v 60, pg 309-319.

Generally, the inorganic oxide support will contain surface hydroxyl groups that will react with a polymerization catalyst. Prior to use, the inorganic oxide may be dehydrated to remove water and to reduce the concentration of surface hydroxyl groups. For example, the inorganic oxide may be heated at a temperature of at least 200° C. for up to 24 hours, typically at a temperature of from about 500° C. to about 800° C. for about 2 to 20 hours, preferably 4 to 10 hours. The resulting support will be free of adsorbed water and should have a surface hydroxyl content from about 0.1 to 5 mmol/g of support, preferably from 0.5 to 3 mmol/g of support. The amount of hydroxyl groups in a silica support may be determined according to the method disclosed by J. B. Peri and A. L. Hensley Jr., in *J. Phys. Chem.*, 72 (8), 1968, pg 2926.

A silica support that is suitable for use in the present invention has a high surface area and is amorphous. By way of example, useful silicas are commercially available under the trademark of Sylopol® 958, 955 and 2408 by the Davison Catalysts, a Division of W. R. Grace and Company and ES-70W by Ineos Silica.

Although heating is the preferred means of removing surface hydroxyl groups present in inorganic oxides, such as silica, the hydroxyl groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. By way of example, a silica support may be treated with an aluminum compound of the formula $R^1{}_b Al(OR^1)_a X_{3-(a+b)}$ where a is either 0 or 1, b is an integer from 1 to 3, a+b is from 1 to 3, $R^1$ is a $C_{1-8}$ alkyl radical, and X is a chlorine atom. The amount of aluminum compound, $R^1{}_b Al(OR^1)_a X_{3-(a+b)}$ is such that the amount of aluminum on the support prior to adding the polymerization catalyst will be from about 0 to 2.5 weight %, preferably from about 0 to 2.0 weight % based on the weight of the support.

Chrome Catalysts

Chrome catalysts include any chromium compound or mixture of compounds capable of polymerizing olefins and which can be deposited on the surface of a support or within a support. Minor amounts of a secondary metal species such as titanium and or aluminum compounds may also be incorporated together with the chromium compound. The chromium compound used can be any appropriate chromium salt or an inorganic or organic chromium compound. For example, chromocene (i.e. bis(cyclopentadienyl)chromium), silyl chromate and chromium oxide may be used. Preferably, the chromium compound is a chromium oxide or a silyl chromate compound.

The chromium oxide may be $CrO_3$ or any compound that is convertible to $CrO_3$ under oxidizing conditions. Examples of compounds that are convertible to $CrO_3$ under oxidizing conditions are disclosed in U.S. Pat. Nos. 2,825,721; 3,023,203; 3,622,251; and 4,011,382 and include but are not limited to chromic acetyl acetone, chromic chloride, chro- mic nitrate, chromic acetate, chromic sulfate, ammonium chromate, ammonium dichromate and other soluble salts of chromate.

The silyl chromate (i.e. silyl chromium) catalysts will have at least one group of the formula I:

wherein R is a hydrocarbyl group having from 1 to 14 carbon atoms.

In a preferred aspect of the invention, the silyl chromate catalyst is a bis-trihydrocarbylsilylchromate having the formula II:

wherein R' is a hydrocarbyl group having from 1 to 14 carbon atoms. R' can independently be any type of hydrocarbyl group such as an alkyl, alkaryl, aralkyl or an aryl radical. Some non-limiting examples include methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those that can be employed in this process are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl) silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

Ziegler Natta Catalysts

Typically, the Ziegler-Natta catalysts comprise a support, a magnesium compound (optionally in the presence of a halide donor to precipitate magnesium halide), a titanium compound and an aluminum compound, in the presence of an electron donor. The aluminum compound may be added at several stages. It may be added to the support to chemically treat it and/or it may be added at some later point during the manufacture of the catalyst.

The Ziegler Natta catalyst may be deposited on or impregnated on the above noted supports such as silica, $SiO_2$; aluminophosphate, $AlPO_4$; magnesia, $MgO$; alumina, $Al_2O_3$; titania, $TiO_2$; zinc oxide, $ZnO$; and zirconia, $ZrO_2$ and the like or mixtures thereof, with $SiO_2$ being most preferred.

Typically the Ziegler-Natta catalyst useful in accordance with the present invention will comprise an aluminum compound of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom, a transition metal, preferably a titanium compound of the formula $Ti((O)_c R^2)_d X_e$ wherein $R^2$ is selected from the group consisting of $C_{1-4}$ alkyl radicals, $C_{6-10}$ aromatic radicals and mixtures thereof, X is selected from the group consisting of a chlorine atom and a bromine atom, c is 0 or 1, d is 0 or an integer up to 4 and e is 0 or an integer up to 4 and the sum of d+e is the valence of the Ti atom; a magnesium compound of the formula $(R^5)_f Mg\, X_{2-f}$ wherein each $R^5$ is independently a $C_{1-8}$ alkyl radical and f is 0, 1 or 2; $CCl_4$ or an alkyl halide selected from the group consisting of $C_{3-6}$ secondary or tertiary alkyl halides and optionally an electron donor, a molar ratio of total Al to Ti (e.g. the first and/or second aluminum additions (if two additions are made) $Al^1$ and $Al^2$—typically if two additions are made from 0 to 60 weight % of the aluminum compound may be used to treat the support and the remaining aluminum is added at some time during the rest of the catalyst synthesis) from 2:1 to 15:1 a molar ratio of Al from the second aluminum ($Al^2$) addition to Ti from 1:1 to 8:1; a molar ratio of Mg:Ti from 0.5:1 to 20:1, preferably 1:1 to 12:1; a molar ratio of active halide (this excludes the halide from the Al and Ti compounds) from the $CCl_4$ or alkyl halide to Mg from 1:1 to 6:1, preferably 1.5:1 to 5:1; and a molar ratio of electron donor to Ti from 0:1 to 18:1, preferably from 1:1 to 15:1.

Typically the catalyst components are reacted in an organic medium such as an inert $C_{5-10}$ hydrocarbon which may be unsubstituted or is substituted by a $C_{1-4}$ alkyl radical. Some solvents include pentane, iso-pentane, hexane, isohexane, heptane, octane, cyclohexane, methyl cyclohexane, hydrogenated naphtha and ISOPAROE (a solvent available from Exxon Chemical Company) and mixtures thereof.

Typically the aluminum compounds useful in the formation of the catalyst or catalyst precursor in accordance with the present invention have the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom. Suitable aluminum compounds include, trimethyl aluminum (TMA), triethyl aluminum (TEAL), isoprenyl aluminum, tri-isobutyl aluminum (TiBAL), diethyl aluminum chloride (DEAC), tri-n-hexyl aluminum (TnHAl), tri-n-octyl aluminum (TnOAl), diethyl aluminum ethoxide and mixtures thereof. The aluminum compounds containing a halide may be an aluminum sesqui-halide. Preferably, in the aluminum compound a is 0, b is 3 and $R^1$ is a $C_{1-8}$ alkyl radical.

The magnesium compound may be a compound of the formula $(R^6)_f MgX_{2-f}$ wherein each $R^5$ is independently selected from the group consisting of $C_{1-8}$ alkyl radicals and f is 0, 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a halogenating agent or reactive organic halide to form magnesium halide (i.e. $MgX_2$ where X is a halogen preferably chlorine or bromine, most preferably chlorine), which precipitates from the solution (potentially forming a substrate for the Ti compound). Some halogenating agents include $CCl_4$ or a secondary or tertiary halide of the formula $R^6 Cl$ wherein $R^6$ is selected from the group consisting of secondary and tertiary $C_{3-6}$ alkyl radicals. Suitable chlorides include sec-butyl chloride, t-butyl chloride and sec-propyl chloride. The reactive halide is added to the catalyst in a quantity such that the active Cl:Mg molar ratio should be from 1.5:1 to 5:1, preferably from 1.75:1 to 4:1, most preferably from 1.9:1 to 3.5:1.

The titanium compound in the catalyst may have the formula $Ti((O)_cR^2)_dX_e$ wherein $R^2$ is selected from the group consisting of $C_{1-4}$ alkyl radicals, $C_{6-10}$ aromatic radicals and mixtures thereof, X is selected from the group consisting of a chlorine atom and a bromine atom, c is 0 or 1, d is 0 or an integer up to 4 and e is 0 or an integer up to 4 and the sum of d+e is the valence of the Ti atom. If c is 1 the formula becomes $Ti(OR^2)_dX_e$ wherein $R^2$ is selected from the group consisting of $C_{1-4}$ alkyl radicals, and $C_{6-10}$ aromatic radicals, X is selected from the group consisting of a chlorine atom and a bromine atom, preferably a chlorine atom, d is 0 or an integer up to 4 and e is 0 or an integer up to 4 and the sum of d+e is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$ and mixtures thereof. Most preferably the titanium compound is selected from the group consisting of $Ti(OC_4H_9)_4$ and $TiCl_4$ and mixtures thereof. Generally, the titanium in the catalyst or catalyst precursor is present in an amount from 0.20 to 5, preferably from 0.20 to 4, most preferably from 0.25 to 3.5 weight % based on the final weight of the catalyst (including the support).

The above catalyst system may be prepolymerized prior to being fed to the reactor. This process is well known to those skilled in the art. For example BP EP0099774, Basell WO 02/074818 A1 and Montel U.S. Pat. No. 5,733,987 disclose such processes. By prepolymerizing the weight ratios of the components in the catalyst or catalyst precursor while initially within the above ranges may be reduced due to the presence of the formed prepolymer.

As noted above, an electron donor may be, and in fact is preferably used in the catalysts or catalysts precursor used in accordance with the present invention. The electron donor may be selected from the group consisting of $C_{3-18}$ linear or cyclic aliphatic or aromatic ethers, ketones, esters, aldehydes, amides, nitriles, amines, phosphines or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor may be used in a molar ratio to the titanium from 0:1 to 18:1 preferably in a molar ratio to Ti from 3:1 to 15:1, most preferably from 3:1 to 12:1.

In the catalyst or catalyst precursor the molar ratio of Mg:Ti may be from 0.5:1 to 20:1, preferably from 1:1 to 12:1, most preferably from 1:1 to 10:1. If a second aluminum addition is used the molar ratio of second aluminum ($Al^2$) to titanium in the catalyst may be from 1:1 to 8:1, preferably from 1.5:1 to 7:1, most preferably from 2:1 to 6:1. Generally, from 0 to not more than about 60 weight %, preferably from 10 to 50 weight %, of the aluminum (compound in the catalyst) may be used to treat the support (e.g. $Al^1$). The molar ratio of active halide (from the alkyl halide or $CCl_4$) to Mg may be from 1.5:1 to 5:1 preferably from 1.75:1 to 4:1, most preferably from 1.9:1 to 3.5:1. The molar ratio of electron donor, if present, to Ti may be from 1:1 to 15:1, most preferably from 3:1 to 12:1.

The Ziegler-Natta catalyst may be activated with one or more co-catalysts of the formula $Al(R^7)_{3-g}X_g$ wherein $R^7$ is a $C_{1-6}$ alkyl radical, X is a chlorine atom and g is 0 or 1 and mixtures thereof. The co-catalyst may be selected from the group consisting of tri $C_{1-6}$ alkyl aluminums, alkyl aluminum chlorides (e.g. di $C_{1-6}$ alkyl aluminum chloride), and mixtures thereof. This includes, but is not limited to, trimethyl aluminum, triethyl aluminum, tri propyl aluminum, tributyl aluminum, tri isobutyl aluminum, isoprenylaluminum, n-hexyl aluminum, diethyl aluminum chloride, dibutyl aluminum chloride, and mixtures thereof. A preferred co-catalyst is triethyl aluminum.

The co-catalyst may be fed to the reactor to provide from 10 to 130, preferably 10 to 80 more preferably from 15 to 70, most preferably from 20 to 60 ppm of aluminum (Al ppm) based on the polymer production rate.

Metallocene Catalysts

The present invention may use a catalyst which is a bulky ligand single site catalyst. Such catalysts are generally used on a support as described above.

The bulky ligand single site catalysts may have the formula:

$$(L)_n\text{-M-}(Y)_p$$

wherein M is selected from the group consisting of Ti, Zr and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon, said bulky heteroatom ligand being sigma or pi-bonded to M, Y is independently selected from the group consisting of activatable ligands; n may be from 1 to 3; and p may be from 1 to 3, provided that the sum of n+p equals the valence state of M, and further provided that two L ligands may be bridged for example by a silyl radical or a $C_{1-4}$ alkyl radical, or a mixture thereof.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents independently selected from the group consisting of $C_{1-10}$ hydrocarbyl radicals which hydrocarbyl substituents are unsubstituted or further substituted by one or more substituents independently selected from the group consisting of a halogen atom; a $C_{1-8}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined above.

Typically the cyclopentadienyl-type ligand is selected from the group consisting of a cyclopentadienyl radical, an indenyl radical and a fluorenyl radical which radicals are unsubstituted or up to fully substituted by one or more substituents independently selected from the group consisting of a fluorine atom, a chlorine atom; $C_{1-4}$ alkyl radicals; and a phenyl or benzyl radical which is unsubstituted or substituted by one or more fluorine atoms.

In the formula above if none of the L ligands is bulky heteroatom ligand then the catalyst could be a mono cyclopentadienyl (Cp) catalyst, a bridged or unbridged bis Cp catalyst or a bridged constrained geometry type catalysts or a tris Cp catalyst.

If the catalyst contains one or more bulky heteroatom ligands the catalyst would have the formula:

wherein M is a transition metal selected from the group consisting of Ti, Hf and Zr; C is a bulky heteroatom ligand preferably independently selected from the group consisting of phosphinimine ligands (as described below) and ketimide ligands (as described below); L is a monoanionic ligand independently selected from the group consisting of cyclopentadienyl-type ligands; Y is independently selected from the group consisting of activatable ligands; m is 1 or 2; n is 0 or 1; and p is an integer and the sum of m+n+p equals the valence state of M, provided that when m is 2, C may be the same or different bulky heteroatom ligands.

For example, the catalyst may be a bis (phosphinimine), a bis (ketimide), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

The preferred metals (M) are from Group 4 (especially titanium, hafnium or zirconium) with titanium being most preferred. In one embodiment the catalysts are group 4 metal complexes in the highest oxidation state.

The catalyst may contain one or two phosphinimine ligands (PI) which are bonded to the metal. The phosphinimine ligand is defined by the formula:

wherein each $R^{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

wherein each $R^{22}$ is independently selected from the group consisting of hydrogen, a $C_{1-8}$ alkyl or alkoxy radical, and $C_{6-10}$ aryl or aryloxy radicals; and a germanyl radical of the formula:

wherein $R^{22}$ is as defined above.

The preferred phosphinimines are those in which each $R^{21}$ is a hydrocarbyl radical, preferably a $C_{1-6}$ hydrocarbyl radical, such as a t-butyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

The substituents "Sub 1" and "Sub 2" may be the same or different. Exemplary substituents include hydrocarbyls having from 1 to 20, preferably from 3 to 6, carbon atoms, silyl groups (as described below), amido groups (as described below) and phosphido groups (as described below). For reasons of cost and convenience it is preferred that these substituents both be hydrocarbyls, especially simple alkyls radicals and most preferably tertiary butyl radicals.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand is not limited to phosphinimine or ketimide ligands and includes ligands which contain at least one heteroatom selected from the group consisting of boron, nitrogen, oxygen, phosphorus, sulfur or silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

wherein the — denotes a bond to the transition metal and Y is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" are intended to convey their conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which may also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" (i.e. "Y" in the above formula) or "leaving ligand" refers to a ligand which may be activated by the aluminoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands (Y) depends upon the valency of the metal and the valency of the activatable ligand. The preferred catalyst metals are Group 4 metals in their highest oxidation state (i.e. $4^+$) and the preferred activatable ligands are monoanionic (such as a halide—especially chloride or $C_{1-4}$ alkyl radicals, especially methyl radicals.

In one embodiment of the present invention the transition metal complex may have the formula: $[(Cp)_nM[N=P(R^{21})]_mY_p$ wherein M is the transition (group 4) metal; Cp is a $C_{5-13}$ ligand containing a 5-membered carbon ring having delocalized bonding within the ring and bound to the metal atom through covalent $\eta^5$ bonds and said ligand being unsubstituted or up to fully 4 substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; $R^{21}$ is a substituent selected from the group consisting of $C_{1-6}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—$(R)_3$ wherein R is $C_{1-4}$ alkyl radical or a phenyl radical; Y is selected from the group consisting of a leaving ligand; n is 1 or 2; m is 1 or 2; and the valence of the transition metal−(n+m)=p.

For the single site type catalyst the activator may be a complex aluminum compound of the formula $R^{12}_2AlO(R^{12}AlO)_qAlR^{12}_2$ wherein each $R^{12}$ is independently selected from the group consisting of $C_{1-20}$ hydrocarbyl radicals and q is from 3 to 50.

In the aluminum compound preferably, $R^{12}$ is a methyl radical and q is from 10 to 40.

The catalysts systems in accordance with the present invention may have a molar ratio of aluminum from the aluminoxane to transition metal from 5:1 to 1000:1, preferably from 10:1 to 500:1, most preferably from 30:1 to 300:1, most desirably from 50:1 to 120:1.

The phrase "and mixtures thereof" in relation to the catalyst mean the catalyst may be a mixture of one or more chromium catalysts, a mixture of one or more Ziegler-Natta catalysts, a mixture of one or more bulky ligand single site catalysts, a mixture of one or more chromium catalysts with one or more Ziegler Natta catalysts, a mixture of one or more Ziegler-Natta catalysts with one or more bulky ligand single site catalysts and a mixture of one or more chromium catalysts with one or more bulky ligand single site catalysts. This phrase also includes mixtures of the catalysts on separate supports ("mixed catalysts") and mixtures of the catalyst on the same support (e.g. "dual catalysts" if two catalyst are used on the same support).

The polymerization is typically a gas phase fluidized bed process. Such processes are well known in the art.

Generally, a seed bed which may or may not be the polymer desired to be produced is charged to a reactor. The seed bed is dried by passing an inert gas, typically nitrogen through it and venting the nitrogen. Then a small amount of a scavenger is added to the seed bed, typically an aluminum alkyl (trimethyl aluminum TEAL) or a dialkyl aluminum alkoxide compound (diethyl aluminum alkoxide) is added to the seed bed in the presence of the heated gas phase (e.g. the condenser in the recycle line is used to heat the recirculating gas) to temperatures typically from about 80° C. to 110° C. Then the composition of the polymerizable gas phase is built up typically comprising in addition to nitrogen, hydrogen, ethylene and one or more $C_{3-6}$ alpha olefins. The gas phase may also comprise from about 3 to 30 mole % of one or more condensable non polymerizable hydrocarbons typically a lower ($C_{2-6}$) branched or straight chain alkane such as butane, pentane, hexane, isopetane and the like.

Then the condenser/cooler in the recycle line may be changed to cooling mode. Then when the appropriate temperature is reached typically from about 80° C. to 110° C. catalyst and where required activator is fed to the reactor. Some catalyst have the activator incorporated on the support and do not require a separate feed of activator. Typically the reaction will start in a sustainable and uniform manner throughout the bed ("light off") in times from about 10 up to about 30 minutes.

While a consistent uniform feed of catalyst is always desired it is particularly so during start up or during catalyst transitions. If there is poor control of the catalyst feed rate there is non uniform enthalpy from the reaction causing temperature fluctuation in the bed. In some circumstances, particularly when operating at relatively low levels in the range from about 4 to 20, in some embodiments from about 5 to 15 and in other embodiments from about 5 to 12 mole % of the condensable alkane in the recycle gas the reaction may actually move from a condensed mode of operation to dry mode or vice versa. This may cause a number of operating problems including sheeting in the lower part of the reactor both above and below the bed plate.

The unit size of particulate material delivered to the entrainment zone (i.e. the shot size) will depend on the dimensions of the channel or hole through the metering disk (i.e. the diameter of the hole and the thickness of the metering plate). On an ongoing basis the mass rate of feed to the reactor will also depend on the speed of rotation of the metering disk. Typically the metering disk is driven by a variable speed electric motor usually through a system of reduction gear system so that the speed of rotation of the metering disk may be adjusted to control the rate of the feed of catalyst to the reactor and ultimately the rate of reaction.

The speed of the metering disk will depend on a number of factors including, among others, the size of the feeder, the bed size of polymer particles being formed in the reactor, the rate of reaction, and the rate of withdrawal of polymer from the reactor. Generally the speed of the metering disk will be between about between 0.1 and 1.3 rpm, preferably less than 0.75 rpm, most preferably less than 0.30 rpm.

As noted control over the bulk feed rate is also obtained by control over the pressure and volume of inert gas, typically nitrogen fed to the upper surface of the metering disk (via channel 5). The pressure of the inert gas fed to the upper side of the metering disk should be at least 2000 kPa (290 psi) preferably greater than 2200 kPa (320 psi) and typically less than about 3450 kPa (500 psi)].

The flow of inert gas to the upper surface of the metering disk will to some extent be a function of the design (e.g. diameter and number of holes through the metering disk. The feed rate of inert gas to the upper surface of the metering disk may be varied from about 10% about 120% of the feed rate to the same catalyst feeder for a standard chrome oxide catalyst (sometimes referred to as S2 catalyst) supported on silica. The flow rate may range from about $9.25 \times 10^{-2}$ m$^3$ per minute (3.27 standard cubic feet per minute (scfm)) to $106 \times 10^{-2}$ m$^3$ per minute (37.3 scfm), in an alternate embodiment from $18.4 \times 10^{-2}$ m$^3$ per minute (6.5 scfm) to $35.4 \times 10^{-2}$ m$^3$ per minute (12.5 scfm). In some instances it may be helpful to reduce the flow rate of inert gas to the surface of the metering disk relative to the flow rate for a chrome oxide catalyst on a silica support.

If the one or more of the pressure and volume of inert gas fed to the surface of the metering disk is too high a number of problems may arise including "blow by" of the catalyst past (around) the metering disk resulting in a complete loss of control over the feed to the reactor. Another potential issue is deposition of particulate material between the metering disk and the upper surface of the circular recess in the bottom plate. Another potential issue is catalyst bridging where the flow rate of the inert gas is not sufficient to transfer catalyst effectively to the entrainment chamber. In this case the flow rate of the inert gas can be increased to get the catalyst flow going to the entrainment chamber.

The pressure and flow of inert gas to the upper surface of the metering disk may be constant or it may be pulsed to coincide with the alignment of the channels (9) through the metering disk with the discharge port (12) in the bottom plate.

For transfer of catalyst from the entrainment chamber (14) to the reactor there is an additional flow of inert gas through tangential port 18.

The present invention will now be illustrated by the following non limiting examples.

EXAMPLE

A supported Ti catalyst comprising a substituted indenyl ligand and a tri-tert butyl phosphinimine ligand and two methyl leaving radicals and alumoxaine activator on a common support was feed to a fluidized gas phase reactor for the polymerization of ethylene and hexene.

The initial flow of nitrogen to the surface of the metering disk was 12 standard cubic feet per minute (about $34 \times 10^{-2}$ m$^3$ per minute) at a pressure of 2350 kPa (about 340 psi). There were some issues of temperatures excursions believed to be due to "blow by" of the catalyst around the feeder.

Figure 2:
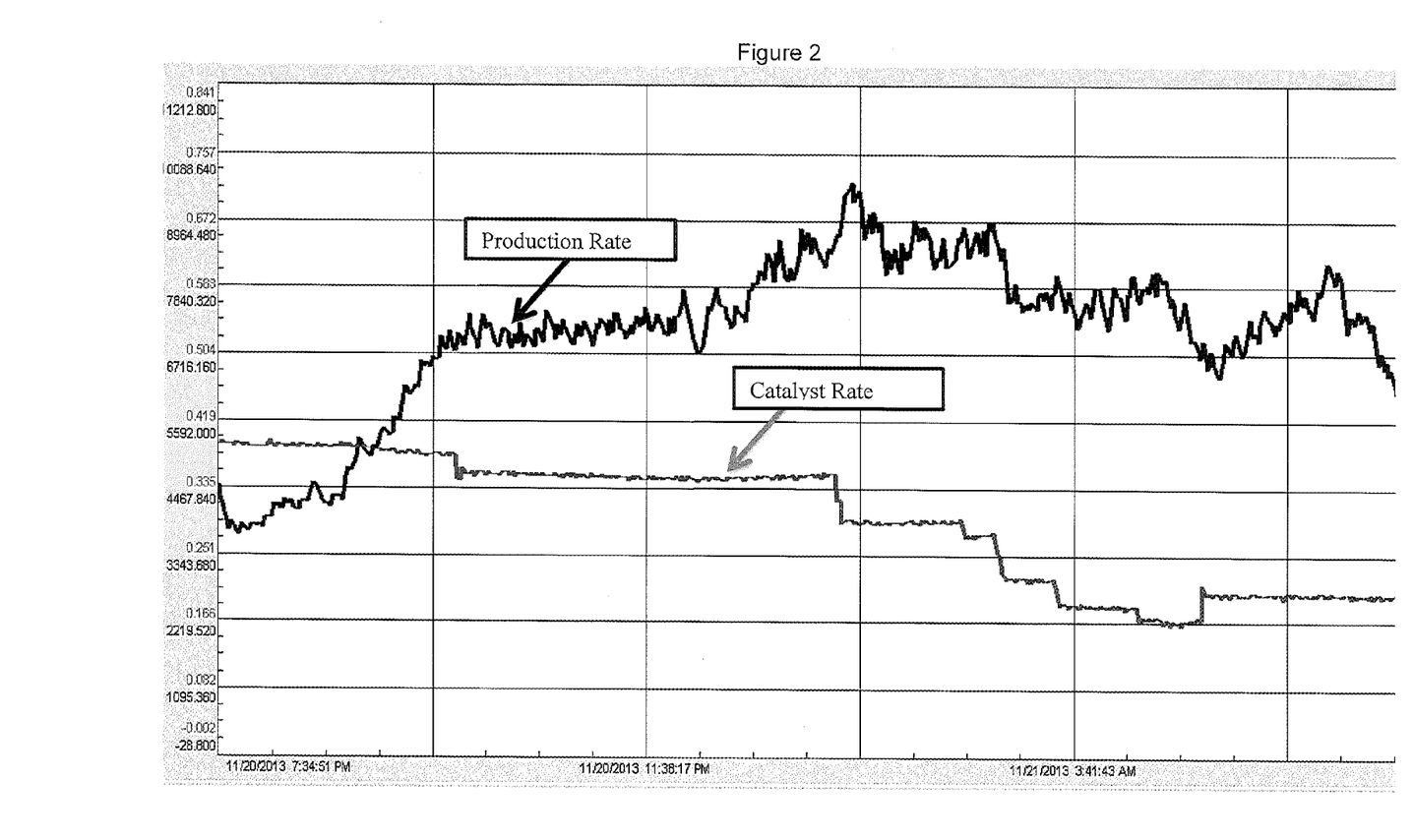
FIG. 2 is a chart showing the mass flow of catalyst at 40% of the "normal" flow rate of nitrogen to the surface of the unit body metering disk and the production rate of the polymerization.

The flow rate of gas to the surface of the metering disk was reduced to 40% of that originally used. FIG. 2 is a plot of flow rate in g/second of catalyst to the feeder and production rate kg/hr.

Figure 3:
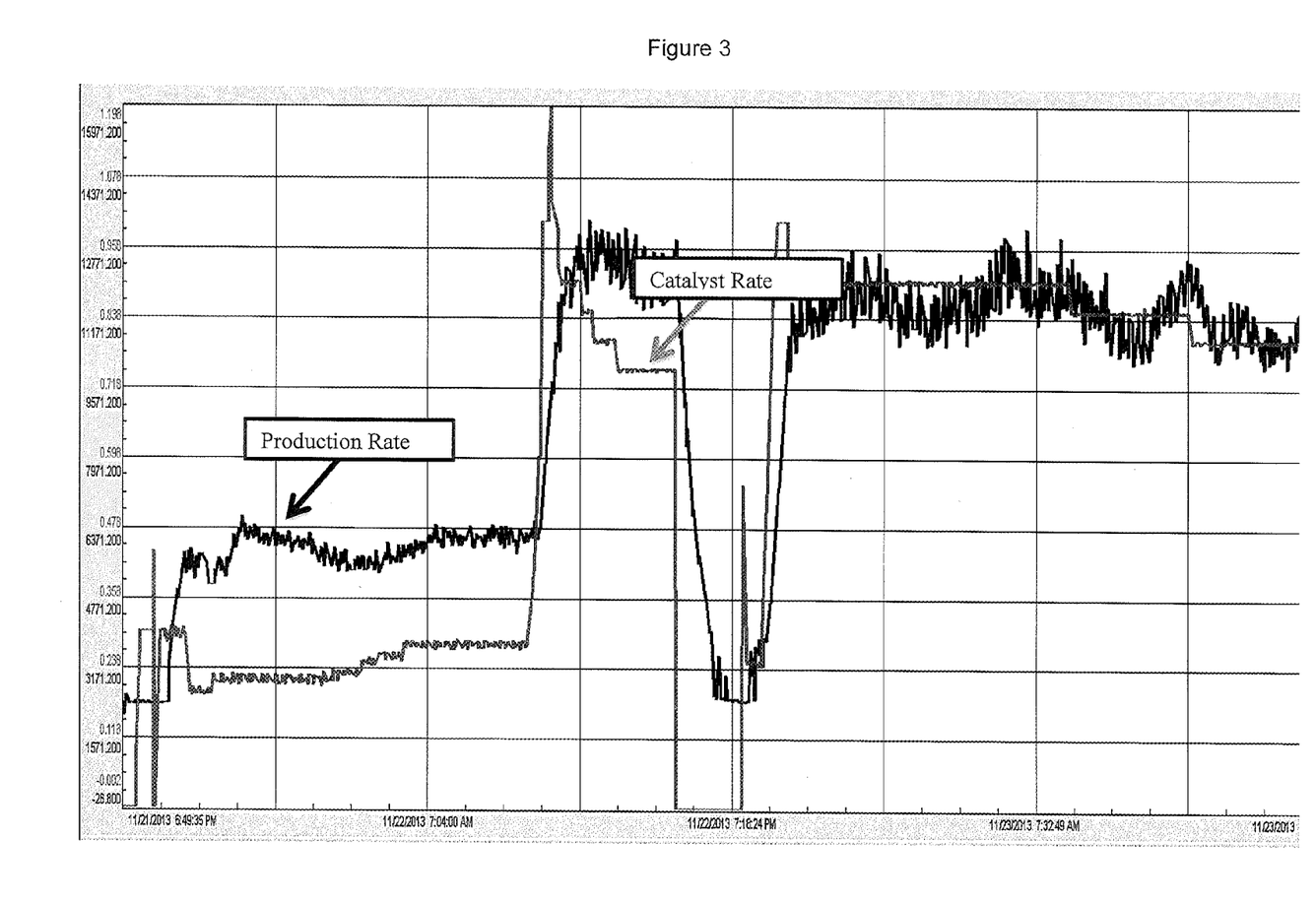
FIG. 3 is a chart showing the mass flow of catalyst at 20% of the "normal" flow rate of nitrogen to the surface of the unit body metering disk and the production rate of the polymerization.

The nitrogen flow to the surface of the metering disk was set at 20% of the original flow rate. FIG. 3 is a plot of flow rate in g/second of catalyst to the feeder and production rate kg/hr. There was a much better correlation between production rate and catalyst feed rate. This resulted in better control over (a more uniform) catalyst feed resulting in better control over the reaction.

The above shows reducing the feed rate of nitrogen to the surface plate of the catalyst feeder gives a more sensitive control over catalyst feed to the reactor resulting in better control over the reaction.

INDUSTRIAL APPLICABILITY

The catalyst feeders of the present invention provide a more uniform flow of catalyst to a polymerization reactor.

The invention claimed is:
1. A method to control the flow of a finely divided particulate material leaving a feeder comprising a metering device comprising in cooperating arrangement:
   a top plate;
   a unit body metering disk having a plurality of equally spaced vertical passages proximate to the perimeter of said metering disk extending through the metering disk adapted to meter predetermined amounts of finely divided materials;
   a drive means;
   a bottom plate having at least one passage there through positioned to receive finely divided particulate material from said metering disk; and
   a variable pressure and variable volume feed rate to feed an inert compressed gas to the upper surface of said metering disk; said top plate and said bottom plant being joined together to define a partially enclosed disk shaped cavity substantially conforming to the shape and size of the metering disk;
   said top plate at least partially covering and in sealing relationship with the upper surface of said disk, and having an opening there through to permit said finely divided particulate material to flow into said cavities and to sweep excess finely divided particulate material off the top of the metering disk as it passes beneath said top plate;
   said drive means extending through at least one of said top or bottom plate or both and connected to a variable drive means to turn said metering disk;
   said method comprising said variable pressure and variable flow volume feed rate feeding inert gas to the upper surface of the metering disk covered by said top plate comprising controlling one or more of the speed of the metering disk, the pressure of the inert gas fed to the upper surface of the metering disk is at least 2000 kPa (290 psi), and the flow volume rate of the inert gas to the upper surface of the metering disk is from $9.24 \times 10^{-2}$ m$^3$ per minute or 3.27 standard cubic feet per minute (scfm) to $106 \times 10^{-2}$ m$^3$ per minute (37.3 scfm).

2. The process according to claim 1, where in the feeder further comprises a reservoir for finely divided particulate material above and in cooperating arrangement with said upper plate.

3. The process according to claim 2, wherein the feeder further comprises a discharge means for said finely divided particulate material below and in cooperating arrangement with said bottom plate feeding a chemical reactor.

4. The process according to claim 3, wherein said finely divided particulate material comprises a catalyst on an inert support selected from the group consisting of silica, alumina, titania, and clays.

5. The process according to claim 4, wherein the catalyst is selected from the group consisting of chrome catalysts, Ziegler Natta catalyst, metallocene catalysts, constrained geometry catalysts and bulky ligand heteroatom catalysts, and mixtures thereof.

6. The process according to claim 5, wherein the speed of the metering disk is between 0.1 and 1.3 rpm.

7. The process according to claim 6, wherein the reactor is a fluidized bed gas phase reactor for the polymerization of olefins and the catalyst has a reactivity of not less than 2000 g of polymer per gram of catalyst.

8. The process according to claim 7, wherein the catalyst contains a phosphinimine ligand.

9. The process according to claim 8, wherein the polymerization is for a polymer comprising ethylene and up to 20 vol. % of one or more $C_{3-6}$ copolymerizable monomers.

10. The process according to claim 9, wherein the gas phase reactor is operated in condensed mode.

* * * * *